United States Patent
Liu et al.

(10) Patent No.: US 11,106,311 B2
(45) Date of Patent: Aug. 31, 2021

(54) DISPLAY DEVICE AND DRIVING METHOD THEREOF

(71) Applicant: WuHan TianMa Micro-electronics CO., LTD., Wuhan (CN)

(72) Inventors: Chuan Liu, Wuhan (CN); Zhihua Yu, Wuhan (CN)

(73) Assignee: WuHan TianMa Micro-electronics CO., LTD., Wuhan (CN)

( * ) Notice: Subject to any disclaimer, the term of this patent is extended or adjusted under 35 U.S.C. 154(b) by 0 days.

(21) Appl. No.: 16/825,758

(22) Filed: Mar. 20, 2020

(65) Prior Publication Data

US 2021/0208728 A1 Jul. 8, 2021

(30) Foreign Application Priority Data

Jan. 3, 2020 (CN) .......................... 202010003727.0

(51) Int. Cl.
*G06F 3/041* (2006.01)
*G06F 3/044* (2006.01)

(52) U.S. Cl.
CPC .......... *G06F 3/0418* (2013.01); *G06F 3/0412* (2013.01); *G06F 3/0445* (2019.05); *G06F 3/04166* (2019.05)

(58) Field of Classification Search
CPC ...... G06F 3/044; G06F 3/0412; G06F 3/0416; G06F 2203/04103; G06F 2203/04112; G06F 2203/04111; G06F 3/0418; G06F 2203/04102
See application file for complete search history.

(56) References Cited

U.S. PATENT DOCUMENTS

| | | | | |
|---|---|---|---|---|
| 8,530,766 | B2 * | 9/2013 | Choi | G06F 3/0443 200/5 A |
| 9,183,778 | B2 * | 11/2015 | Lee | H04N 13/341 |
| 10,276,118 | B2 * | 4/2019 | Xing | G06F 3/0412 |
| 2008/0136980 | A1 * | 6/2008 | Rho | G06F 3/0412 349/12 |
| 2010/0013745 | A1 * | 1/2010 | Kim | H01L 27/3244 345/76 |

(Continued)

FOREIGN PATENT DOCUMENTS

CN 104991683 A 10/2015

*Primary Examiner* — Olga V Merkoulova
(74) *Attorney, Agent, or Firm* — Christensen O'Connor Johnson Kindness PLLC

(57) ABSTRACT

Provided is a display device including: a display panel including a cathode layer including a cathode electrode, and touch electrodes including a touch driving electrode; a touch driving chip electrically connected to and providing a touch driving signal to the touch driving electrode; and a signal conversion unit electrically connected to a first electrode and providing a first driving signal to the first electrode. During the charging period, the touch driving signal is charged from a first level to a second level, and the first driving signal is charged from a third level to a fourth level. During the discharging period, the touch driving signal is discharged from the second level to the first level, and the first driving signal is discharged from the fourth level to the third level. The first electrode is the cathode electrode, or located between the touch driving electrode and the cathode electrode.

20 Claims, 10 Drawing Sheets

(56) References Cited

U.S. PATENT DOCUMENTS

| | | | | |
|---|---|---|---|---|
| 2011/0316802 A1* | 12/2011 | Choi | .................... | G06F 3/0446 345/173 |
| 2012/0105341 A1* | 5/2012 | Park | ...................... | G06F 3/042 345/173 |
| 2013/0241814 A1* | 9/2013 | Hirabayashi | ......... | G09G 3/3611 345/100 |
| 2014/0192019 A1* | 7/2014 | Fukushima | ........... | G06F 3/0446 345/174 |
| 2014/0292711 A1* | 10/2014 | Teranishi | ............. | G09G 3/3696 345/174 |
| 2014/0375606 A1* | 12/2014 | Abe | ...................... | G02F 1/1337 345/174 |
| 2015/0049045 A1* | 2/2015 | Yousefpor | ............. | G06F 3/0412 345/174 |
| 2015/0162387 A1* | 6/2015 | Gu | ....................... | G06F 3/0412 345/174 |
| 2015/0277657 A1* | 10/2015 | Azumi | ................. | G09G 3/3648 345/174 |
| 2015/0380467 A1* | 12/2015 | Su | ......................... | G06F 3/0412 257/40 |
| 2016/0132170 A1* | 5/2016 | Zhang | .................. | G06F 3/0445 345/173 |
| 2016/0170525 A1* | 6/2016 | Zhai | .................... | G06F 3/04164 345/174 |
| 2017/0115808 A1* | 4/2017 | Cho | .................... | G06F 3/04166 |
| 2020/0142525 A1* | 5/2020 | Han | ...................... | G06F 1/1643 |

* cited by examiner

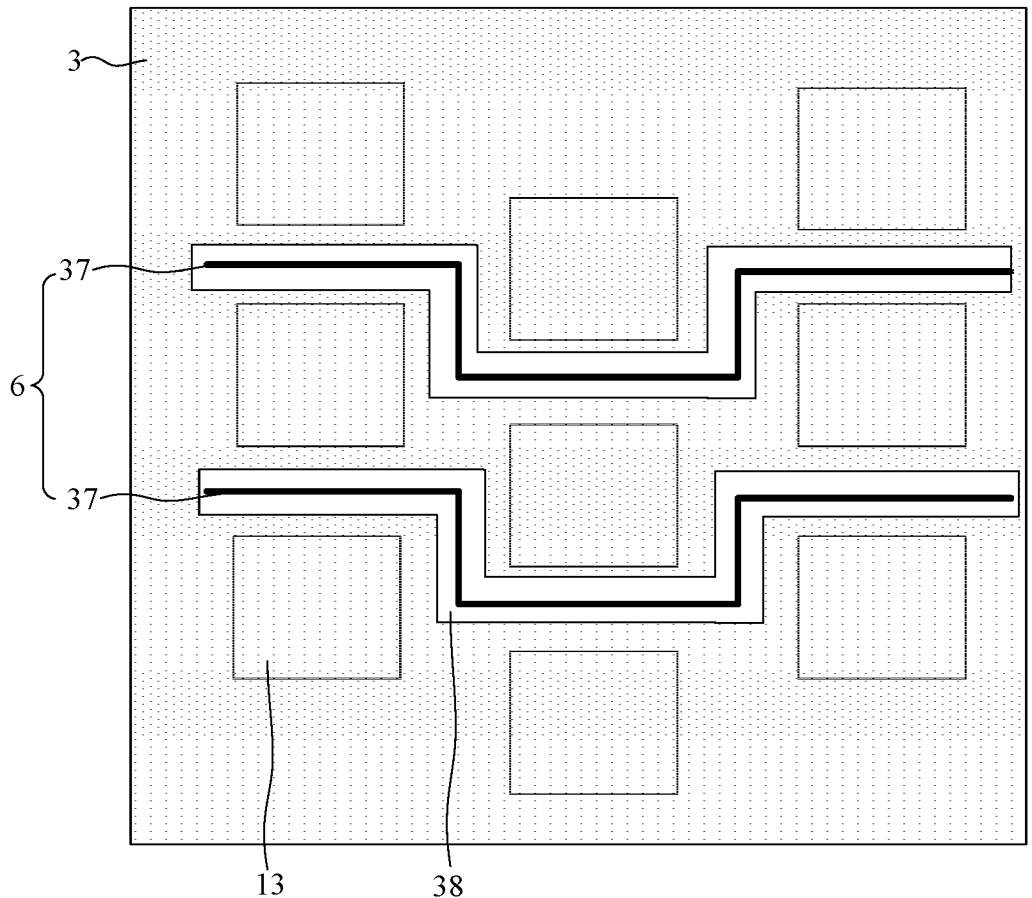

FIG. 13

S1 — providing the touch driving signal to the touch driving electrode, wherein the touch driving electrode has a driving cycle comprising a charging period, a potential maintaining period, and a charging period, during the charging period, the touch driving signal is charged from a first level to a second level, and during the discharging period, the touch driving signal is discharged from the second level to the first level S2 — providing the first driving signal to the first electrode, wherein during the charging period, the first driving signal is charged from a third level to a fourth level, and during the charging period, the first driving signal is discharged from the fourth level to the third level

FIG. 14

DISPLAY DEVICE AND DRIVING METHOD THEREOF

CROSS-REFERENCE TO RELATED APPLICATIONS

The present application claims the benefit of priority to Chinese Patent Application No. 202010003727.0, filed on Jan. 3, 2020, the content of which is incorporated herein by reference in its entirety.

TECHNICAL FIELD

The present disclosure relates to the field of display technologies, and in particular, to a display device and a driving method thereof.

BACKGROUND

A display device having a touch function includes an array layer, an encapsulation layer, and a touch layer, which are sequentially arranged along a thickness direction. At present, for some display devices, the touch layer is deposited directly on the encapsulation layer, so as to reduce cost and thickness of the display device, but in this case, there would be a small spacing between a touch electrode in the touch layer and a cathode electrode in the array layer, thereby resulting in a large parasitic capacitance between the touch electrode and the cathode electrode. As a result, the parasitic capacitance affects a touch capacitance formed between the touch electrodes. When a display screen is being touched, detection errors occur and thus a touch performance is affected.

SUMMARY

In view of this, embodiments of the present disclosure provide a display device and a driving method thereof, which can decrease an influence of a signal transmitted on the cathode electrode on charging and discharging of a touch capacitance and increase a touch detection accuracy.

In an aspect, an embodiment of the present disclosure provides a display device, including: a display panel including a substrate, a cathode layer located at a side of the substrate and including a cathode electrode, and touch electrodes located at a side of the cathode layer facing away from the substrate and including a touch driving electrode and a touch sensing electrode; a touch driving chip electrically connected to the touch driving electrode and configured to provide a touch driving signal to the touch driving electrode, where the touch driving electrode has a driving cycle including a charging period, a potential maintaining period and a discharging period; during the charging period, the touch driving signal is charged from a first level to a second level; and during the discharging period, the touch driving signal is discharged from the second level to the first level; and a signal conversion unit electrically connected to a first electrode and configured to provide a first driving signal to the first electrode, wherein during the charging period, the first driving signal is charged from a third level to a fourth level, and during the discharging period, the first driving signal is discharged from the fourth level to the third level. The first electrode is the cathode electrode, or the first electrode is located between the touch driving electrode and the cathode electrode.

In another aspect, an embodiment of the present disclosure provides a driving method of a display device. The driving method is applied to the display device described above, and includes: providing the touch driving signal to the touch driving electrode, where the touch driving electrode has a driving cycle including a charging period, a potential maintaining period, and a charging period, during the charging period, the touch driving signal is charged from a first level to a second level, and during the discharging period, the touch driving signal is discharged from the second level to the first level; and providing the first driving signal to the first electrode, where during the charging period, the first driving signal is charged from a third level to a fourth level, and during the charging period, the first driving signal is discharged from the fourth level to the third level.

BRIEF DESCRIPTION OF DRAWINGS

In order to more clearly illustrate technical solutions in embodiments of the present disclosure, the accompanying drawings used in the embodiments are briefly introduced as follows. It should be noted that the drawings are merely part of the embodiments of the present disclosure, other drawings can also be acquired by those skilled in the art.

FIG. 13 is a schematic diagram of a structure of a cathode layer according to an embodiment of the present disclosure; and FIG. 14 is a flowchart of a driving method according to an embodiment of the present disclosure.

DESCRIPTION OF EMBODIMENTS

To better illustrate technical solutions of the present disclosure, embodiments of the present disclosure are described in detail as follows with reference to the accompanying drawings.

It should be noted that the described embodiments are merely exemplary embodiments of the present disclosure, which shall not be interpreted as limiting the present disclosure. All other embodiments obtained by those skilled in the art according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association relationship describing associated objects, indicating that there may be three relationships, for example, A and/or B may indicate that three cases, i.e., A existing individually, A and B existing simultaneously, B existing individually. In addition, the character "/" herein generally indicates that the related objects before and after the character form an "or" relationship.

Figure 1:
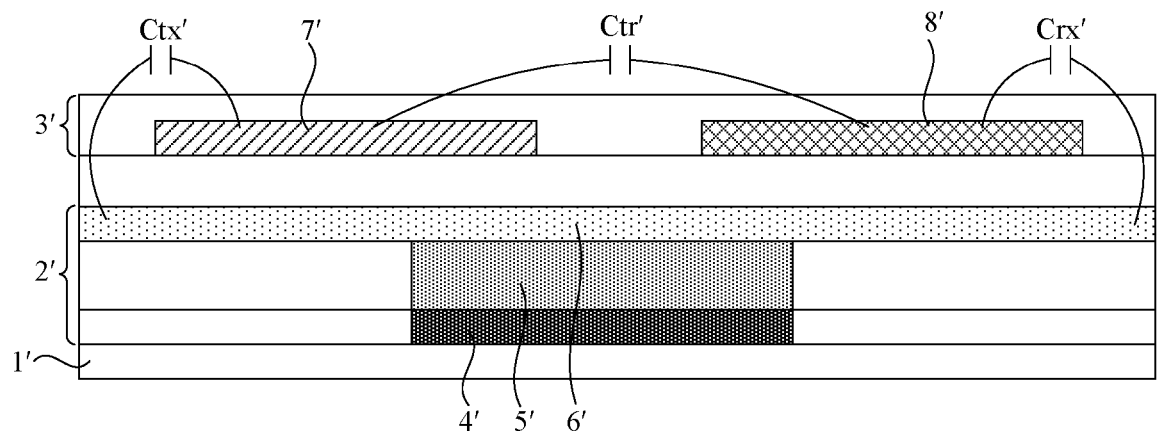
FIG. 1 is a schematic diagram of a layer structure of a display panel in the related art.

FIG. 1 is a schematic diagram of a layer structure of a display panel in the related art. As shown in FIG. 1, the display panel includes a substrate 1', and an array layer 2' and a touch layer 3' are formed on the substrate 1'. The array layer 2' includes an anode 4', a light-emitting layer 5' and a cathode electrode 6'. The touch layer 3' includes a touch driving electrode 7' and a touch sensing electrode 8'. A touch capacitance Ctr' is formed between the touch driving electrode 7' and the touch sensing electrode 8'. When a user touches the display screen with a finger, a capacitance value of the touch capacitance Ctr' at a touch position will accordingly change.

Figure 2:
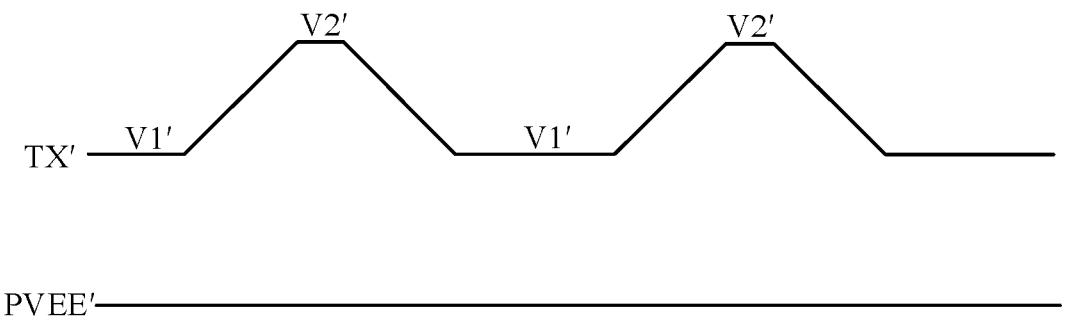
FIG. 2 is a signal time sequence of a touch driving signal and a negative power supply signal in the related art.

Since the touch driving electrode 7' and the touch sensing electrode 8' are close to the cathode electrode 6', a parasitic capacitance inevitably exits between the touch driving electrode 7' and the cathode electrode 6' and between the touch sensing electrode 8' and the cathode electrode 6'. During charging of the touch capacitance Ctr', a first parasitic capacitance Ctx' formed between the touch driving electrode 7' and the cathode electrode 6', and a second parasitic capacitance Crx' formed between the touch sensing electrode 8', and the cathode electrode 6' would hinder charging of the touch capacitance Ctr', resulting in incomplete charging of the touch capacitance Ctr'. In particular, for the first parasitic capacitance Ctx', in conjunction with FIG. 2, which is a signal time sequence of a touch driving signal and a negative power supply signal in the related art, when a touch driving signal TX' is used to charge the touch driving electrode 7' from a first potential V1' to a second potential V2', since a negative power supply signal PVEE' received by the cathode electrode 6' is a stable and continuous potential signal, due to a performance of the capacitance of maintaining a constant potential difference between two ends, the negative power supply signal PVEE' would hinder the touch driving electrode 7' from being charged to the second potential V2'. In view of this, the touch driving electrode 7' might be charged slowly, and thus would be maintained at a stable second potential V2' for a short time, resulting in incomplete charging of the touch driving electrode 7'. As a result, the touch capacitance Ctr' cannot reach its standard capacitance value. Accordingly, a change of the capacitance value of the touch capacitance Ctr' caused by the touch will also decrease, and thus the change of the capacitance value cannot reach a change threshold, thereby causing detection errors and affecting the touch performance.

Figure 3:
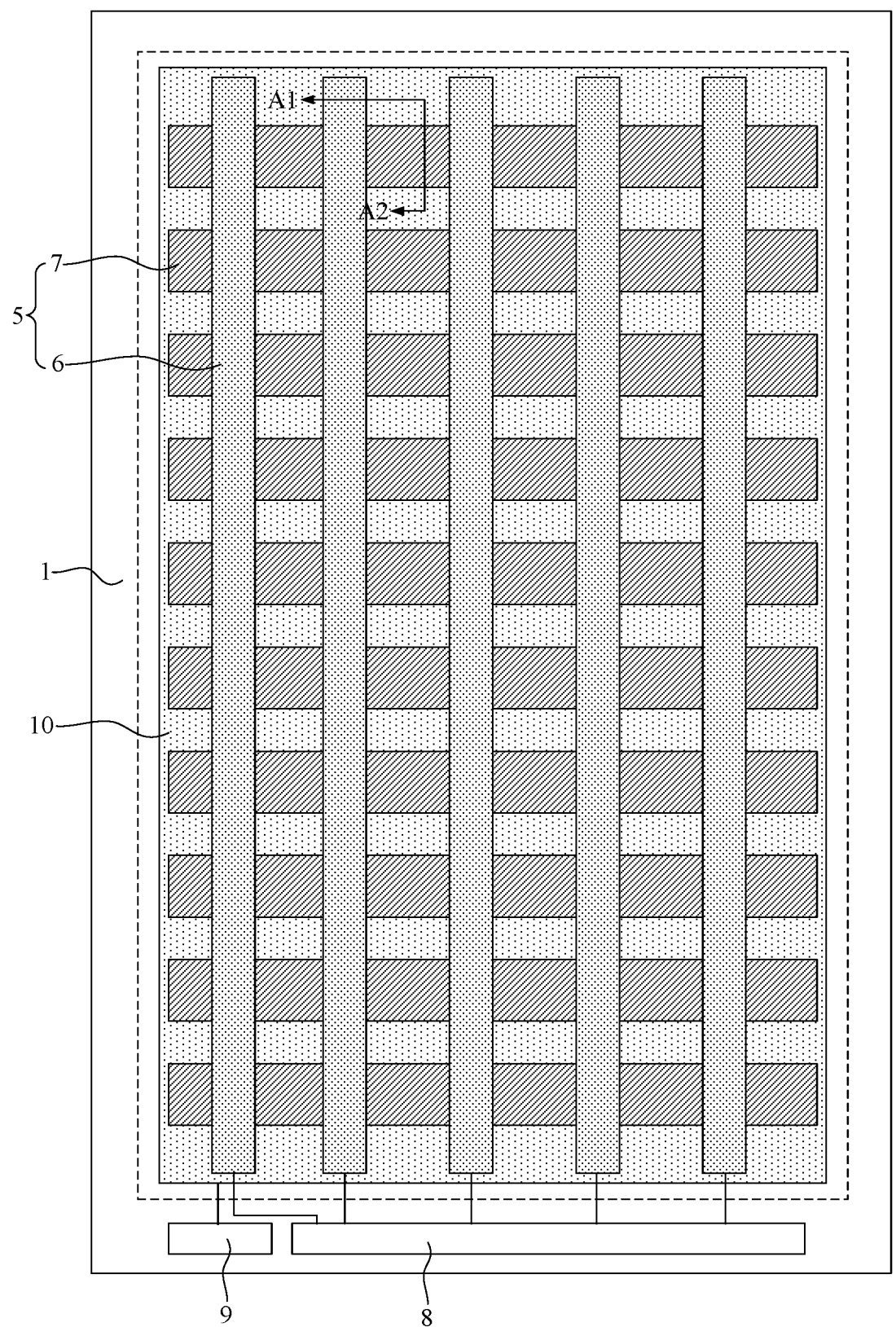
FIG. 3 is a schematic diagram of a structure of a display device according to an embodiment of the present disclosure.
Figure 4:
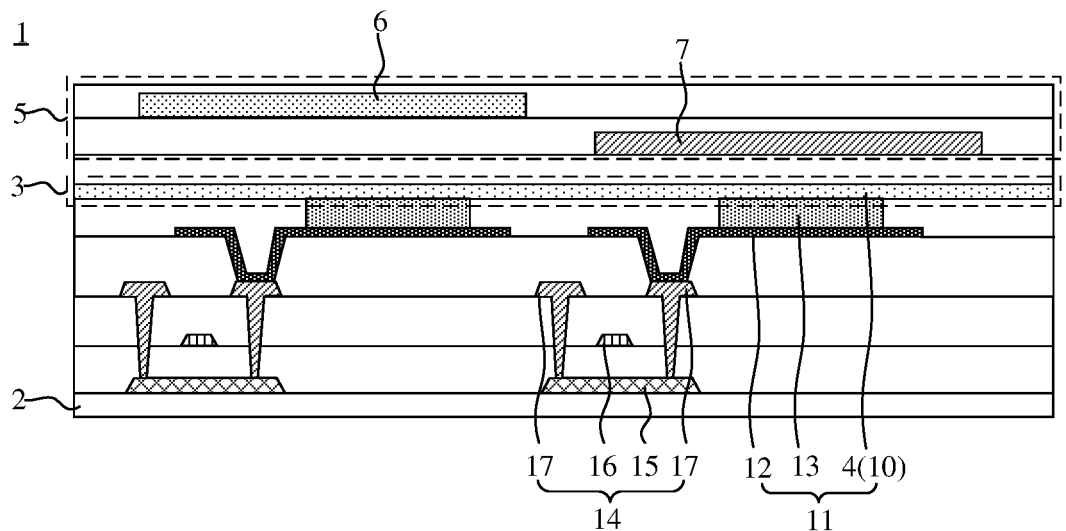
FIG. 4 is a cross-sectional view along A1-A2 of FIG. 3.
Figure 5:
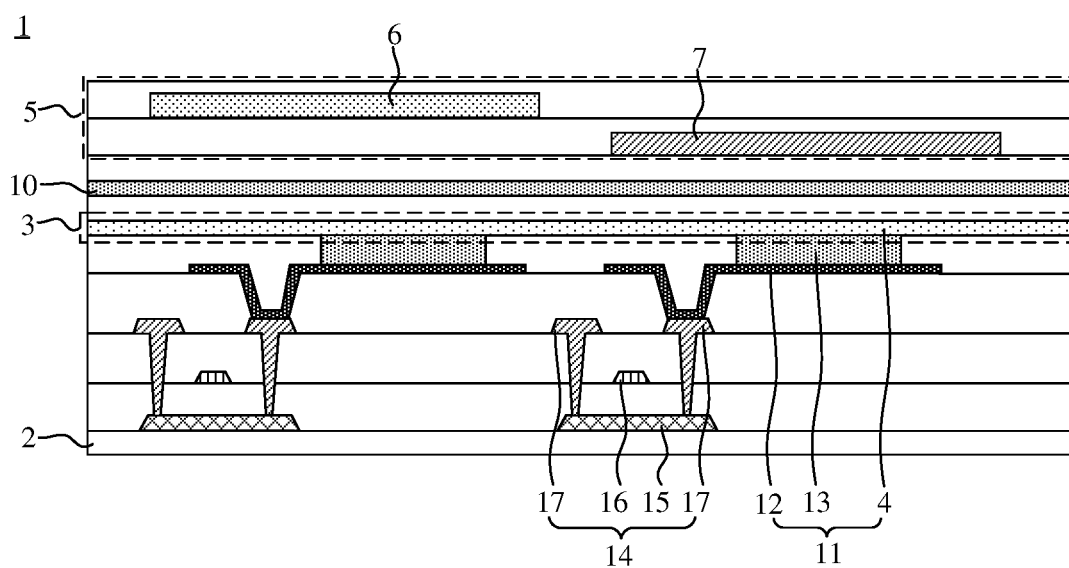
FIG. 5 is another cross-sectional view along A1-A2 of FIG. 3.

In view of this, embodiments of the present disclosure provide a display device. FIG. 3 is a schematic diagram of a structure of a display device according to an embodiment of the present disclosure, FIG. 4 is a cross-sectional view along A1-A2 of FIG. 3, and FIG. 5 is another cross-sectional view along A1-A2 of FIG. 3. As shown in FIG. 3 to FIG. 5, the display device includes a display panel 1. The display panel 1 includes: a substrate 2; a cathode layer 3 located at a side of the substrate 2 and including a cathode electrode 4; and touch electrodes 5 located at a side of the cathode layer 3 facing away from the substrate 2. The touch electrodes 5 include a touch driving electrode 6 and a touch sensing electrode 7. A touch capacitance is formed between the touch driving electrode 6 and the touch sensing electrode 7. When a user touches the display screen with a finger, a change of the capacitance value of the touch capacitance at a touch position will change. By detecting the change of the capacitance value of the touch capacitance at different positions, the touch position can be detected.

Figure 6:
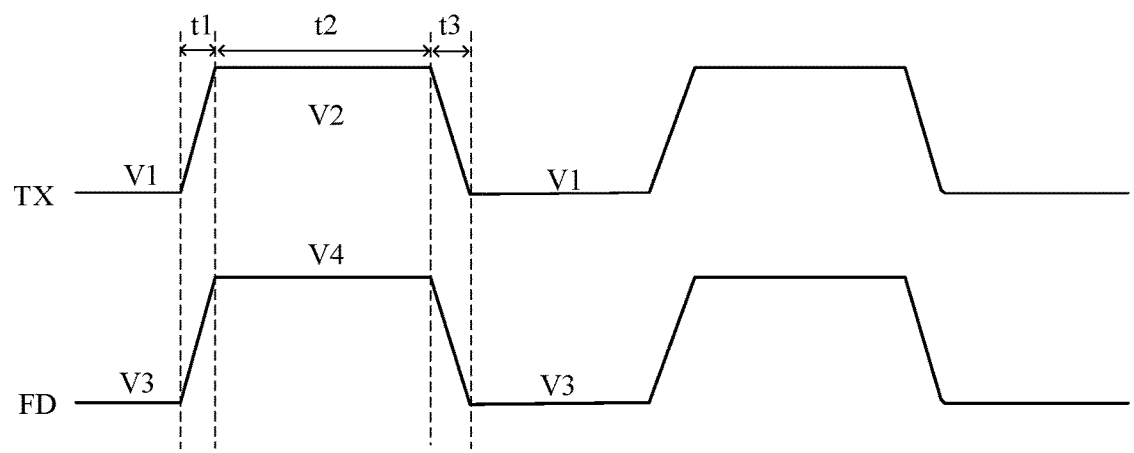
FIG. 6 is a signal time sequence of a touch driving signal and a first driving signal according to an embodiment of the present disclosure.

In addition, the display device further includes a touch driving chip 8 and a signal conversion unit 9. The touch driving chip 8 is electrically connected to the touch driving electrode 6. FIG. 6 is a signal time sequence of a touch driving signal and a first driving signal according to an embodiment of the present disclosure. As shown in FIG. 6, the touch driving chip 8 is configured to provide a touch driving signal TX to the touch driving electrode 6. A driving cycle of the touch driving electrode 6 (i.e., a cycle of the touch driving signal TX) includes a charging period t1, a potential maintaining period t2, and a discharging period t3. During the charging period t1, the touch driving signal TX is charged from a first level to a second level. During the discharging period t3, the touch driving signal TX is discharged from the second level to the first level. The signal conversion unit 9 is electrically connected to a first electrode 10. The signal conversion unit 9 is configured to provide a first driving signal FD to the first electrode 10. During the charging period t1, the first driving signal FD is charged from a third level to a fourth level. During the discharging period t3, the first driving signal FD is discharged from the fourth level to the third level. The first electrode 10 can be the cathode electrode 4 as shown in FIG. 4, or the first electrode 10 can be located between the touch driving electrode 6 and the cathode electrode 4 as shown in FIG. 5.

In an example, the first level has a first potential V1, the second level has a second potential V2, the third level has a third potential V3, and the fourth level has a fourth potential V4. In this case, when the first electrode 10 is the cathode electrode 4, a parasitic capacitance is formed between the touch driving electrode 6 and the cathode electrode 4. At this time, the touch driving electrode 6 and the cathode electrode 4 are regarded as two ends of the parasitic capacitance. During the charging period t1, the touch driving signal TX is charged from the first level to the second level, so that the potential at the touch driving electrode 6 increases from the first potential V1 to the second potential V2, and at the same time, the first driving signal FD provided by the signal conversion unit 9 to the cathode electrode 4 is charged from the third level to the fourth level, so that the potential on the cathode electrode 4 increases from the third potential V3 to the fourth potential V4. That is, with the increase of the potential at the touch driving electrode 6, the potential at the cathode electrode 4 also increases. Since the capacitance has the effect of maintaining a constant potential difference between two ends, the potential at the cathode electrode 4 will not hinder changing of the potential at the touch driving electrode 6, thereby accelerating charging of the touch driving electrode 6 and thus decreasing charging time. Correspondingly, this can increase time during which the touch driving electrode 6 is maintained at the stable second potential V2, thereby achieving a more complete charging of the touch driving electrode 6, i.e., a more complete charging of the touch capacitance. For the same reason, during the discharging period t3, the touch driving signal TX is discharged from the second level to the first level, and the first driving signal FD provided by the signal conversion unit 9 to the cathode electrode 4 is discharged from the fourth level to the third level. In this case, with the decrease of the potential at the touch driving electrode 6, the potential at the cathode electrode 4 also decreases, so as to accelerate discharging of the touch driving electrode 6, thereby achieving the more complete discharging of the touch driving electrode 6, i.e., the more complete discharging of the touch capacitance. This process does not affect potential in a next cycle.

Analogously, when the first electrode 10 is located between the touch driving electrode 6 and the cathode electrode 4, by providing a first electrode 10 between the touch driving electrode 6 and the cathode electrode 4 and configuring the signal conversion unit 9 to provide a first driving signal FD to the first electrode 10, a change of the potential at the first electrode 10 accelerates charging and discharging of the touch driving electrode 6, thereby effectively alleviating an effect on charging and discharging of the touch driving electrode 6 by the stable low potential transmitted on the cathode electrode 4, while decreasing a coupling effect of the cathode electrode 4 on the touch driving electrode 6, thereby increasing the touch accuracy.

With the display device according to the embodiments of the present disclosure, during the charging periods t1 and t3, by controlling the first electrode 10 and the touch driving electrode 6 to have a same direction of potential change, charging and discharging of the touch driving electrode 6 can be accelerated. In this way, a more complete charging and discharging of the touch driving electrode 6 can be achieved, so that the touch capacitance formed between the touch driving electrode 6 and the touch sensing electrode 7 can be charged to a standard capacitance value. When a touch occurs, a change of the capacitance value of the touch capacitance at the touch position can reach a change threshold, thereby effectively increasing detection accuracy of the touch position.

It should be understood that the display panel 1 includes a pixel circuit and a light-emitting element that are electrically connected. According to an image to be displayed on the display panel 1, the pixel circuit is provided with a corresponding data signal, and based on cooperation of multiple transistors in the pixel circuit, the pixel circuit outputs a driving current signal corresponding to the data signal to the light-emitting element, thereby driving the light-emitting element to emit light. It should be noted that during a data writing period during which the data signal is written into the pixel circuit, the pixel circuit and the light-emitting element is turned off. Therefore, when the first electrode 10 is the cathode electrode 4, even if a first driving signal FD having a potential change is applied to the cathode electrode 4, writing of the data signal will not be affected. Moreover, a magnitude of the driving current is related to the data signal and a positive power supply signal, and a signal received by the cathode electrode 4 has no effect on the magnitude of the driving current. Therefore, applying the first driving signal FD to the cathode electrode 4 has no effect on the normal light emission of the display panel 1.

Further, with further reference to FIG. 4 and FIG. 5, in addition to the cathode electrode 4, the layer where the light-emitting element is located further includes an anode 12 and a light-emitting layer 13, and the layer where the pixel circuit 14 is located may include an active layer 15, a gate layer 16 and a source/drain layer 17.

In addition, it should be noted that when the first electrode 10 is located between the cathode electrode 4 and the touch driving electrode 6, in order to prevent the first electrode 10 from influencing the normal light output of the display panel 1, the first electrode 10 may be a transparent electrode. Moreover, in order to avoid mutual crosstalk of signals at the cathode electrode 4 and the first electrode 10, an insulation layer can be further provided between the cathode electrode 4 and the first electrode 10.

Further, with reference to FIG. 6, the first level has a first potential V1, the second level has a second potential V2, the third level has a third potential V3, and the fourth level has a fourth potential V4. During the potential maintaining period t2, the touch driving signal TX is maintained at the second potential V2, the first driving signal FD is maintained at the fourth potential V4; and there is a first potential difference between the first potential V1 and the second potential V2, and there is a second potential difference between the third potential V3 and the fourth potential V4. Here, the first potential difference is equal to the second potential difference.

With such a configuration, the first driving signal FD and the touch driving signal TX have same waveforms. During the charging period t1, the touch driving electrode 6 is charged from the first potential V1 to the second potential V2, and the first electrode 10 is charged from the third potential V3 to the fourth potential V4. In this case, since the first potential difference is equal to the second potential difference, the two electrodes have a same charging slope. During the potential maintaining period t2, the touch driving electrode 6 is stably maintained at the second potential V2, and the first electrode 10 is stably maintained at the fourth potential V4. During the discharging period t3, the touch driving electrode 6 is discharged from the second potential V2 to the first potential V1, and the first electrode 10 is discharged from the fourth potential V4 to the third potential V3. In this case, since the first potential difference is equal to the second potential difference, the two have a same discharging slope. A change of the first driving signal FD is consistent with a change of the touch driving signal TX during each period. That is, two ends of the parasitic capacitance have a same potential change, so that the signal transmitted on the first electrode 10 can be used to accelerate charging and discharging of the touch driving electrode 6 to a greater extent.

Figure 7:
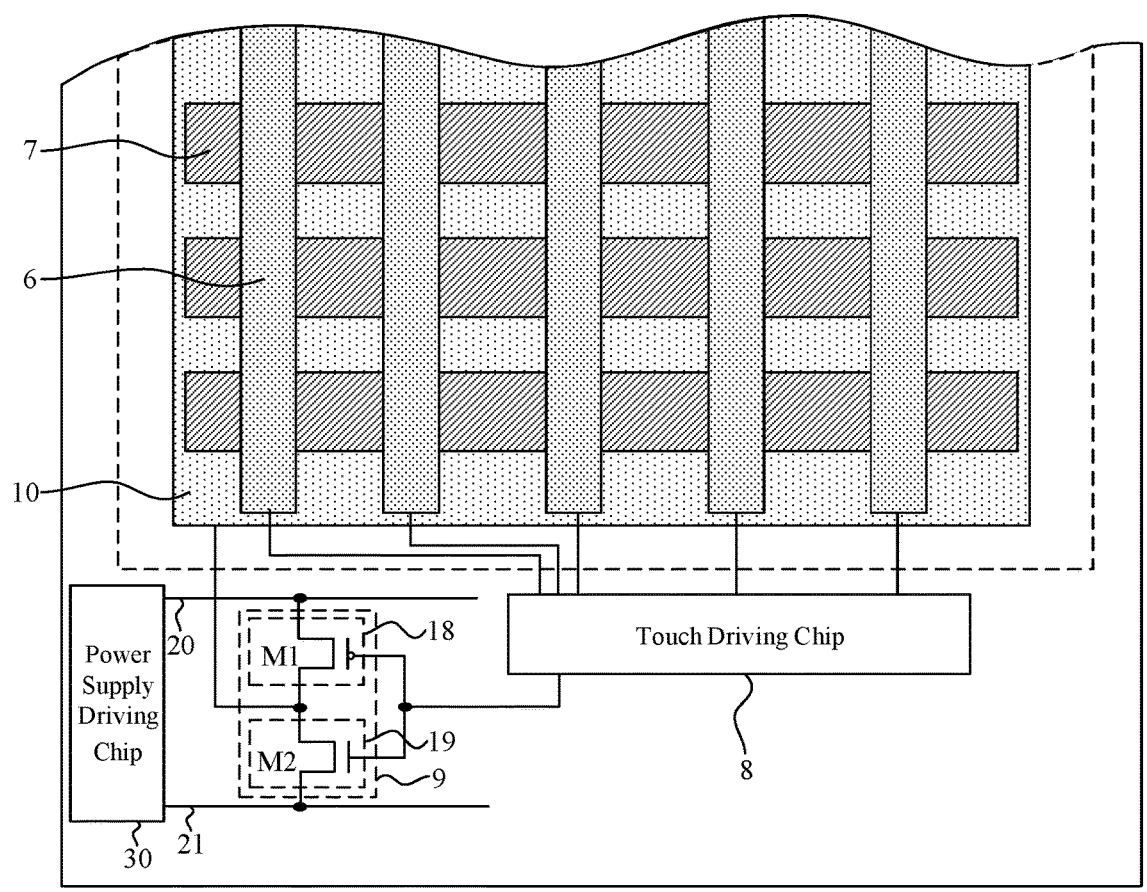
FIG. 7 is a schematic diagram of a structure of a signal conversion unit according to an embodiment of the present disclosure.

FIG. 7 is a schematic diagram of a structure of a signal conversion unit according to an embodiment of the present disclosure. In an example, as shown in FIG. 7, the signal conversion unit 9 is also electrically connected to the touch driving chip 8. Under driving of the touch driving signal TX, the signal conversion unit 9 provides the first driving signal FD to the first electrode 10. The first driving signal FD is outputted under driving of the touch driving signal TX, thereby further improving reliability of a same change direction of the first driving signal FD and the touch driving signal TX.

In an example, with further reference to FIG. 7, the signal conversion unit 9 includes a first control module 18 and a second control module 19. The first control module 18 is electrically connected to a third potential signal line 20, the touch driving chip 8 and the first electrode 10, respectively.

The first control module 18 is configured to transmit the third potential V3 provided by the third potential signal line 20 to the first electrode 10 under driving of the first level of the touch driving signal TX. The second control module 19 is electrically connected to a fourth potential signal line 21, the touch driving chip 8 and the first electrode 10, respectively. The second control module 19 is configured to transmit the fourth potential V4 provided by the fourth potential signal line 21 to the first electrode 10 under driving of the second level of the touch driving signal TX.

When the touch driving chip 8 outputs the first level, the first control module 18 outputs the third level in response to the first level. At this time, the first potential V1 is transmitted on the touch driving chip 8, and accordingly, the third potential V3 corresponding to the first potential V1 is transmitted on the first electrode 10. When the touch driving chip 8 outputs the second level, the second control module 19 outputs the fourth level in response to the second level. At this time, the second potential V2 is transmitted on the touch driving chip 8, and accordingly, the fourth potential V4 corresponding to the second potential V2 is transmitted on the first electrode 10. With such a configuration, the same change direction of the potentials at the first electrode 10 and the touch driving electrode 6 can be achieved, thereby achieving that the signal transmitted on the first electrode 10 can accelerate charging and discharging of the touch driving electrode 6.

Further, with reference to FIG. 7, the first control module 18 includes a first transistor M1. The first transistor M1 includes a gate electrode electrically connected to the touch driving chip 8, a first terminal electrically connected to the third potential signal line 20, and a second terminal electrically connected to the first electrode 10. When the touch driving chip 8 outputs the first level, the first transistor M1 controls a path between the first terminal and the second terminal to be turned on, thereby controlling the third potential V3 provided by the third potential signal line 20 to be transmitted to the first electrode 10. The second control module 19 includes a second transistor M2. The second transistor M2 includes a gate electrode electrically connected to touch driving chip 8, a first terminal electrically connected to the fourth potential signal line 21, and a second terminal electrically connected to the first electrode 10. When the touch driving chip 8 outputs the second level, the second transistor M2 controls a path between the first terminal and the second terminal to be turned on, thereby controlling the fourth potential V4 provided by the fourth potential signal line 21 to be transmitted to the first electrode 10. Here, the first transistor M1 is a P-type transistor, and the second transistor M2 is an N-type transistor. In this way, the first transistor M1 is turned on when the touch driving chip 8 outputs the first level which is lower, and the second transistor M2 is turned on when the touch driving chip 8 outputs the second level which is higher.

Figure 8:
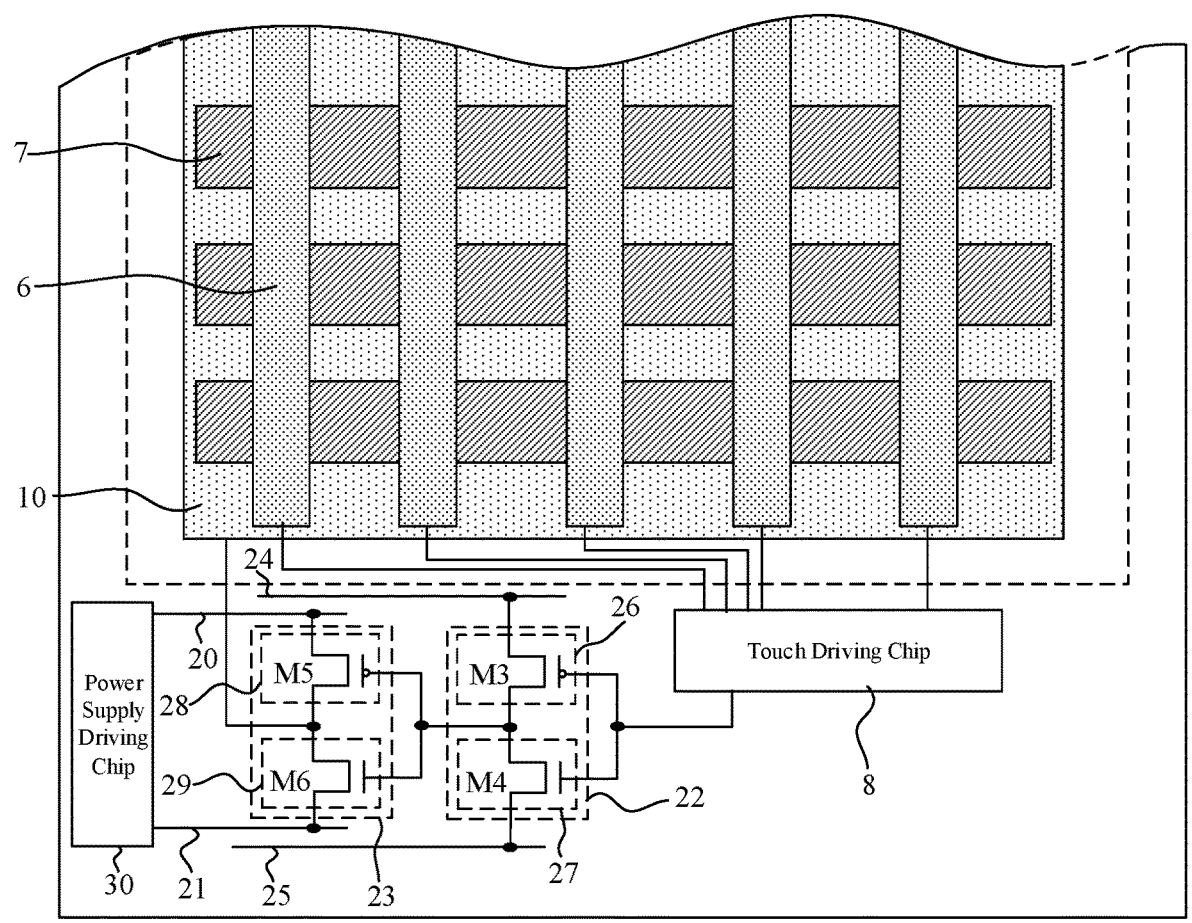
FIG. 8 is a schematic diagram of another structure of a signal conversion unit according to an embodiment of the present disclosure.

FIG. 8 is a schematic diagram of another structure of a signal conversion unit according to an embodiment of the present disclosure. In an example, as shown in FIG. 8, the signal conversion unit 9 includes a first signal conversion circuit 22 and a second signal conversion circuit 23. The first signal conversion circuit 22 is electrically connected to a first control signal line 24, a second control signal line 25, and the touch driving chip 8, respectively. The first signal conversion circuit 22 is configured to output a first control signal provided by the first control signal line 24 under driving of the first level of the touch driving signal TX, and output a second control signal provided by the second control signal line 25 under driving of the second level of the touch driving signal TX. The second signal conversion circuit 23 is electrically connected to the third potential signal line 20, the fourth potential signal line 21, the first signal conversion circuit 22, and the first electrode 10, respectively. The second signal conversion circuit 23 is configured to transmit the third potential V3 provided by the third potential signal line 20 to the first electrode 10 in response to the first control signal, and to transmit the fourth potential V4 provided by the fourth potential signal line 21 to the first electrode 10 in response to the second control signal.

When the touch driving chip 8 outputs the first level, the first control module 18 outputs the first control signal to drive the second signal conversion circuit 23 to output the third potential V3 to the first electrode 10. At this time, the first potential V1 is transmitted on the touch driving chip 8, and accordingly, the third potential V3 corresponding to the first potential V1 is transmitted on the first electrode 10. When the touch driving chip 8 outputs the second level, the first control module 18 outputs the second control signal to drive the second signal conversion circuit 23 to output the fourth potential V4. At this time, the second potential V2 is transmitted on the touch driving chip 8, and accordingly, the fourth potential V4 corresponding to the second potential V2 is transmitted on the first electrode 10. With such a configuration, the same change direction of the potentials at the first electrode 10 and on the touch driving electrode 6 can be achieved, thereby achieving that the signal transmitted on the first electrode 10 can accelerate charging and discharging of the touch driving electrode 6.

In an example, with further reference to FIG. 8, the first signal conversion circuit 22 includes a third control module 26 and a fourth control module 27. The third control module 26 is electrically connected to the first control signal line 24, the touch driving chip 8, and the second signal conversion circuit 23, respectively. The first control module 18 is configured to output the first control signal under driving of the first level of the touch driving signal TX. The fourth control module 27 is electrically connected to the second control signal line 25, the touch driving chip 8, and the second signal conversion circuit 23, respectively. The fourth control module 27 is configured to output the second control signal under driving of the second level of the touch driving signal TX. By controlling the third control module 26 and the fourth control module 27 to operate independently in such a manner that they respectively output the first control signal and the second control signal, an output accuracy of the first control signal and the second control signal can be increased. This can prevent the two signals from influencing each other, thereby increasing an accuracy of the second signal conversion circuit 23 outputting the third potential V3 and the fourth potential V4.

Further, with reference to FIG. 8, the third control module 26 includes a third transistor M3. The third transistor M3 includes a gate electrode electrically connected to the touch driving chip 8, a first terminal electrically connected to the first control signal line 24, and a second terminal electrically connected to the second signal conversion circuit 23. When the touch driving chip 8 outputs the first level, the third transistor M3 controls a path between the first terminal and the second terminal to be turned on, thereby controlling the first control signal provided by the first control signal line 24 to be transmitted to the second signal conversion circuit 23. The fourth control module 27 includes a fourth transistor M4. The fourth transistor M4 includes a gate electrode electrically connected to the touch driving chip 8, a first terminal electrically connected to the second control signal line 25, and a second terminal electrically connected to the second signal conversion circuit 23. When the touch driving chip 8 outputs the second level, the fourth transistor M4 controls a path between the first terminal and the second terminal to be turned on, thereby controlling the second control signal provided by the second control signal line 25 to be transmitted to the second signal conversion circuit 23. Here, the third transistor M3 is a P-type transistor, and the fourth transistor M4 is an N-type transistor. In this way, the third transistor M3 is turned on when the touch driving chip 8 outputs the first level which is lower, and the fourth transistor M4 is turned on when the touch driving chip 8 outputs the second level which is higher.

As another example, with further reference to FIG. 8, the second signal conversion circuit 23 includes a fifth control module 28 and a sixth control module 29. The fifth control module 28 is electrically connected to the third potential signal line 20, the first signal conversion circuit 22, and the first electrode 10, respectively. The fifth control module 28 is configured to transmit the third potential V3 to the first electrode 10 in response to the first control signal. The sixth control module 29 is electrically connected to the fourth potential signal line 21, the first signal conversion circuit 22, and the first electrode 10, respectively. The sixth control module 29 is configured to transmit the fourth potential V4 to the first electrode 10 in response to the second control signal. By controlling the fifth control module 28 and the sixth control module 29 to operate independently in such a manner that they respectively output the third potential V3 and the fourth potential V4 to the first electrode 10, an output accuracy of the third potential V3 and the fourth potential V4 can be increased. This can achieve a synchronization between a change of the potential at the first electrode 10 and a change of the potential at the touch driving electrode 6.

Further, with reference to FIG. 8, the fifth control module 28 includes a fifth transistor M5. The fifth transistor M5 includes a gate electrode electrically connected to the first signal conversion circuit 22, a first terminal electrically connected to the third potential signal line 20, and a second terminal electrically connected to the first electrode 10. When the first signal conversion circuit 22 outputs the first control signal, the fifth transistor M5 controls a path between the first terminal and the second terminal to be turned on, thereby controlling the third potential V3 provided by the third potential signal line 20 to be transmitted to the first electrode 10. The sixth control module 29 includes a sixth transistor M6. The sixth transistor M6 includes a gate electrode electrically connected to the first signal conversion circuit 22, a first terminal electrically connected to the fourth potential signal line 21, and a second terminal electrically connected to the first electrode 10. When the first signal conversion circuit 22 outputs the second control signal, the sixth transistor M6 controls a path between the first terminal and the second terminal to be turned on, thereby controlling the fourth potential V4 provided by the fourth potential signal line 21 to be transmitted to the first electrode 10. Here, when the first control signal provided by the first control signal line 24 is at a high level and the second control signal provided by the second control signal line 25 is at a low level, the fifth transistor M5 is an N-type transistor and the sixth transistor M6 is a P-type transistor. Conversely, when the first control signal provided by the first control signal line 24 is at a low level and the second control signal provided by the second control signal line 25 is at a high level, the fifth transistor M5 is a P-type transistor and the sixth transistor M6 is an N-type transistor.

In an example, with further reference to FIG. 7 and FIG. 8, the display device further includes a power supply driving chip 30. The third potential signal line 20 and the fourth potential signal line 21 are electrically connected to the power supply driving chip 30, respectively. The power supply driving chip 30 existing in the display device is used to provide signals to the third potential signal line 20 and the fourth potential signal line 21. Thus, there is no need to additionally provide other driving chips or signal terminals, thereby reducing a manufacturing cost. It should be noted that the power supply driving chip 30 is usually disposed on a back plate of the display device. In this case, the third potential signal line 20 and the fourth potential signal line 21 can be electrically connected to the power supply driving chip 30 through a connector.

In an example, in conjunction with FIG. 4, when the first electrode 10 is the cathode electrode 4, the fourth potential V4 satisfies: $-3.7V \leq V4 \leq 1.7V$. With reference to the time sequence of the first driving signal FD shown in FIG. 6, it can be known that the first driving signal FD has two potentials, i.e., the third potential V3 and the fourth potential V4, and the third potential V3 is lower than the fourth potential V4. By setting the fourth potential V4 to be between $-3.7V$ and $-1.7V$, on a premise that the fourth potential V4 is low and the light-emitting element can be driven to emit light normally, the third potential V3 can be pulled lower, so that the potentials outputted to the cathode electrode 4 are both low potentials, thereby guaranteeing light emission stability of the light-emitting element.

In an embodiment, in conjunction with FIG. 5, when the first electrode 10 is located between the driving touch electrode 5 and the cathode electrode 4, the signal transmitted on the cathode electrode 4 is not influenced by the first driving signal FD. In this case, a negative power supply driving signal having a voltage of V5 can be provided to the cathode electrode 4, and V5 satisfies: $-3.7V \leq V5 \leq -1.7V$, so that the cathode electrode 4 continues to receive a stable low potential, thereby further preventing the signal transmitted on the cathode electrode 4 from influencing light emission of the light-emitting element.

Figure 9:
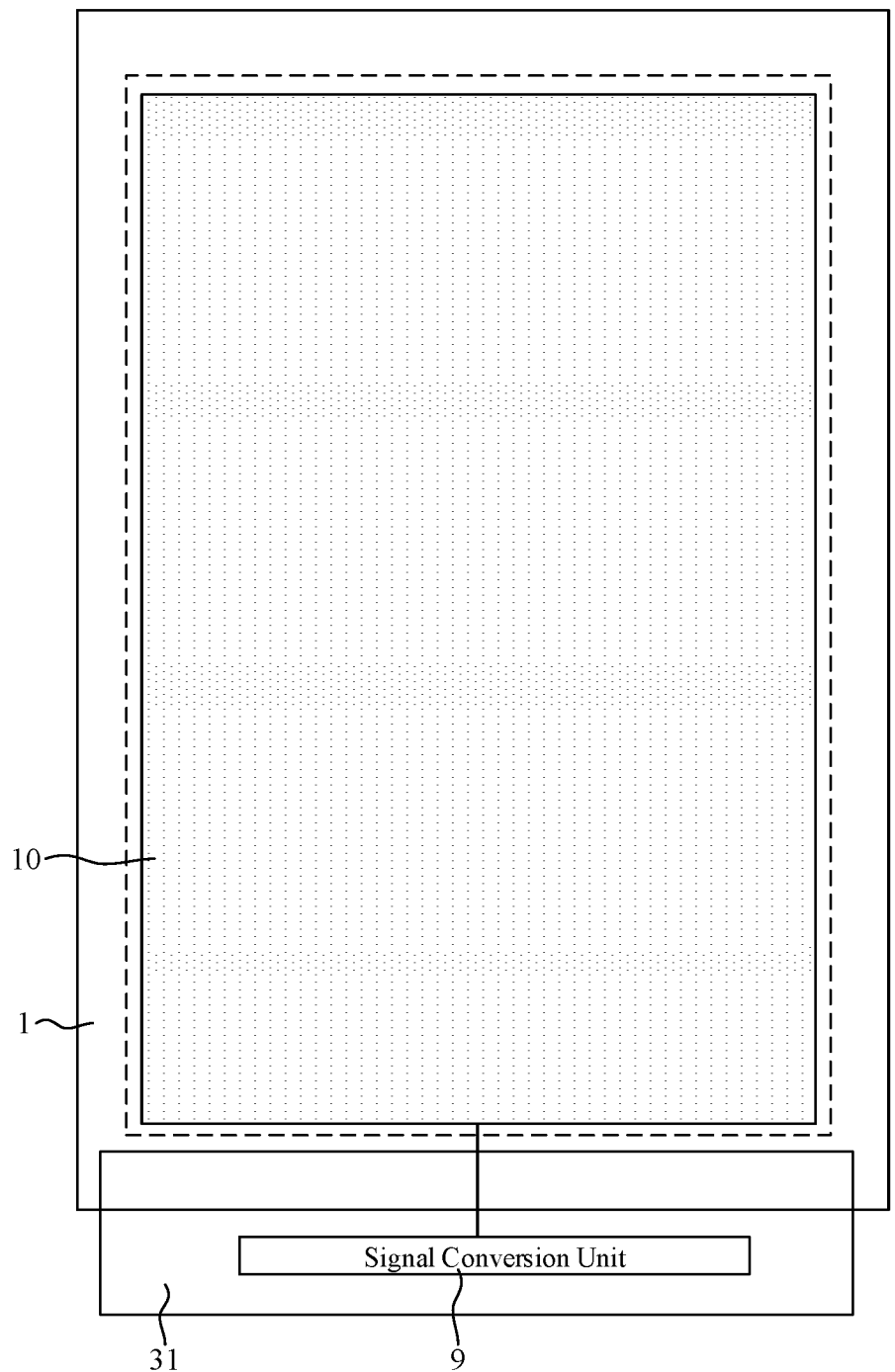
FIG. 9 is a schematic diagram of another structure of a display device according to an embodiment of the present disclosure.

FIG. 9 is a schematic diagram of another structure of a display device according to an embodiment of the present disclosure. In an example, as shown in FIG. 9, the display device further includes a flexible circuit board 31 which is bound to the display panel 1. The signal conversion unit 9 is provided on the flexible circuit board 31. After the flexible circuit board 31 is bound to the display panel 1, the flexible circuit board may be bent to be disposed on a back of the display panel 1. Providing the signal conversion unit 9 on the flexible circuit board 31 can prevent the signal conversion unit 9 from occupying space in the display panel 1, thereby decreasing a width of a bezel of the display panel 1.

Figure 10:
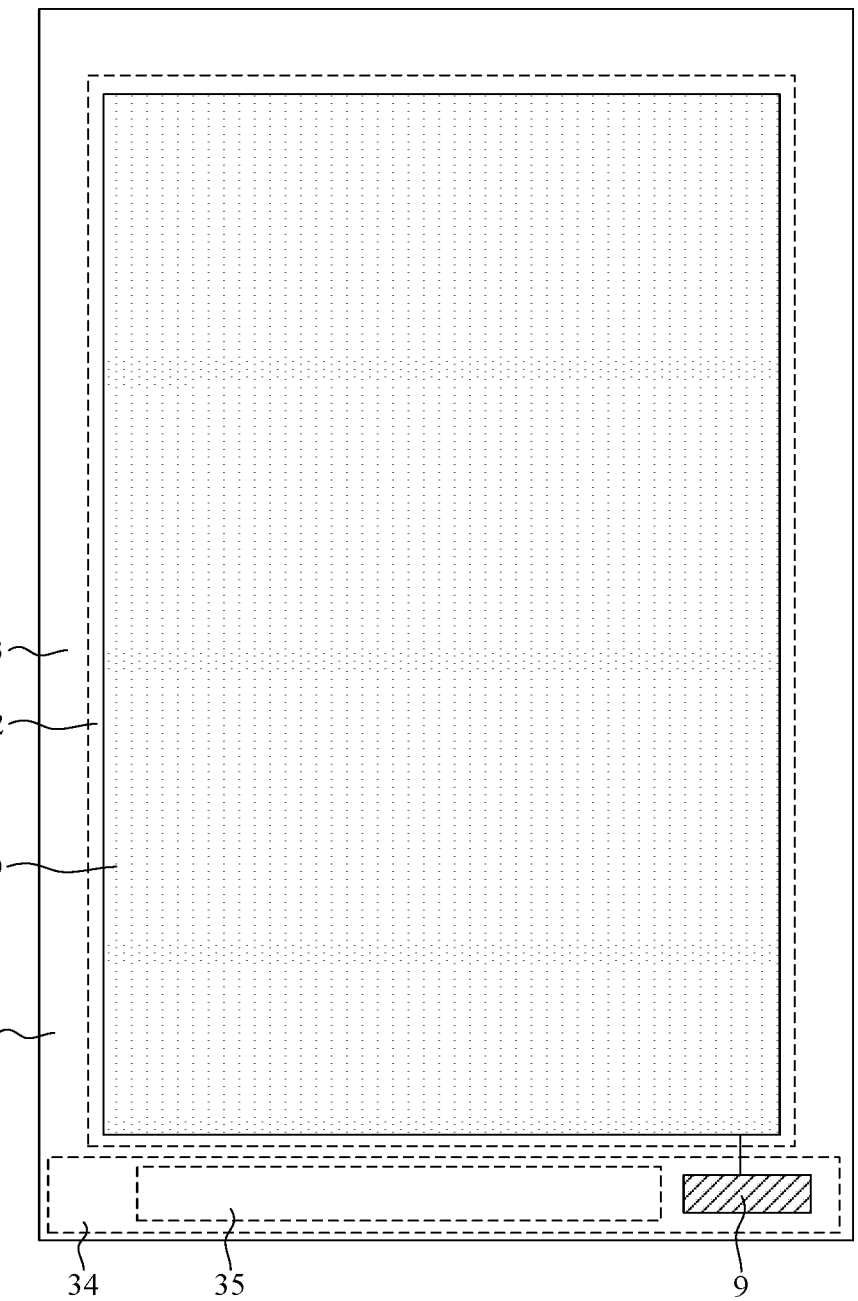
FIG. 10 is a schematic diagram of still another structure of a display device according to an embodiment of the present disclosure.

FIG. 10 is a schematic diagram of still another structure of a display device according to an embodiment of the present disclosure. In an example, as shown in FIG. 10, the display panel 1 has a display area 32 and a non-display area 33 surrounding the display area 32. The non-display area 33 includes a first non-display area 34. The first non-display area 34 includes a chip-binding area 35 for binding a display driving chip. The signal conversion unit 9 is disposed in the first non-display area 34. In the non-display area 33, the first non-display area 34 is a lower step area of the display panel 1, and a bezel thereof has a relatively large width. Compared with a case in which the signal conversion unit 9 is disposed in another area of the non-display area 33, arranging the signal conversion unit 9 in the first non-display area 34 that has a large accommodation space will not have a significant influence on the bezel of the display panel 1. Moreover, when the signal conversion unit 9 is arranged in the display panel 1, connection wiring between the signal conversion unit 9 and the first electrode 10 is more convenient, and a wire therefore is shorter.

Figure 11:
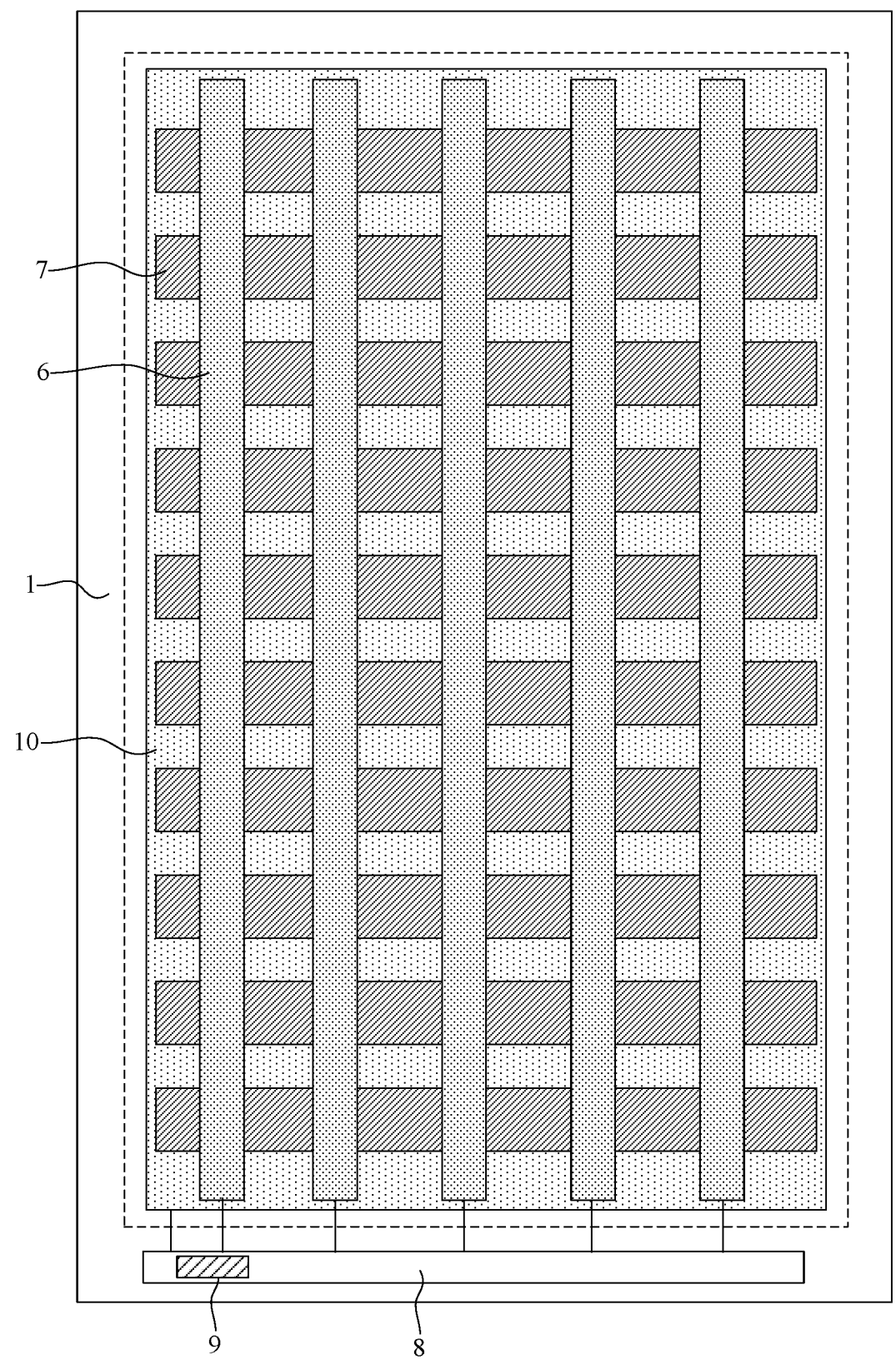
FIG. 11 is a schematic diagram of yet another structure of a display device according to an embodiment of the present disclosure.

FIG. 11 is a schematic diagram of yet another structure of a display device according to an embodiment of the present disclosure. In an example, as shown in FIG. 11, the signal conversion unit 9 is integrated into the touch driving chip 8. By integrating the signal conversion unit 9 into the touch driving chip 8, which has a function of outputting both the touch driving signal TX and the first driving signal FD, the signal conversion unit 9 does not need to occupy additional space in the display device, thereby facilitating a narrow bezel design of the display device.

Figure 12:
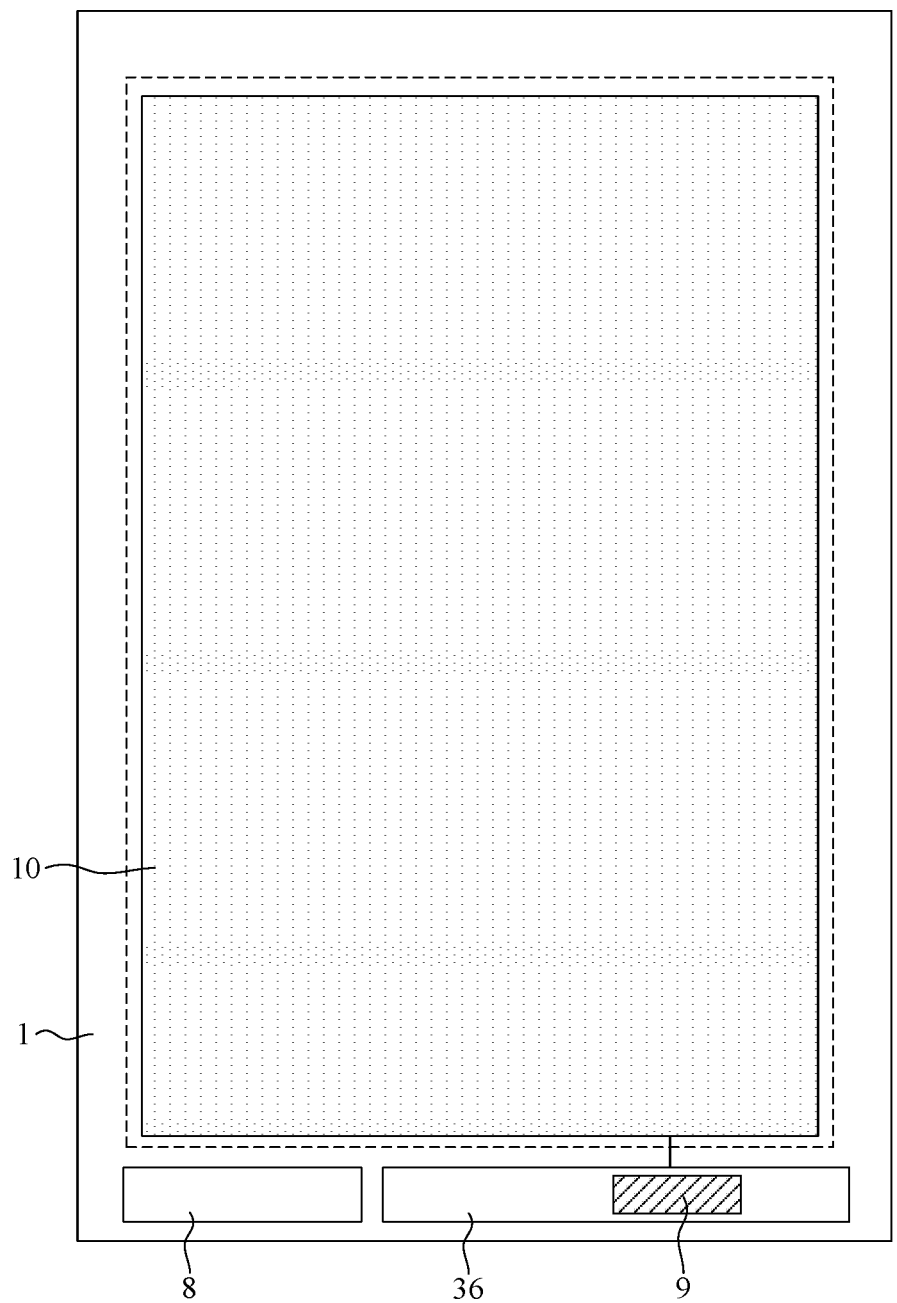
FIG. 12 is a schematic diagram of another structure of a display device according to an embodiment of the present disclosure.

FIG. 12 is a schematic diagram of another structure of a display device according to an embodiment of the present disclosure. In an example, as shown in FIG. 12, the display device further includes a display driving chip 36. The display driving chip 36 is configured to provide a data signal to the pixel circuit so that the pixel circuit controls the light-emitting element to emit light. The signal conversion unit 9 is integrated into the display driving chip 36. By integrating the signal conversion unit 9 into the existing display driving chip 36, which has the function of outputting both the data signal and the first driving signal FD, the signal conversion unit 9 does not need to occupy additional space in the display device, thereby enabling a narrow bezel design of the display device.

FIG. 13 is a schematic diagram of a structure of a cathode layer according to an embodiment of the present disclosure. In an example, as shown in FIG. 13, the touch driving electrode 6 includes a plurality of touch metal wires 37. The cathode layer 3 has a hollow area 38. In a direction perpendicular to a plane of the cathode layer 3, the touch metal wire 37 is located in the hollow area 38. In order to reduce blocking of light by the touch driving electrode 6, the touch driving electrode 6 can be formed by a plurality of touch metal wires 37 into a grid structure. By hollowing out an area of the cathode layer 3 corresponding to the touch metal wire 37, the parasitic capacitance formed between the touch driving electrode 6 and the cathode layer 3 can be further reduced, thereby reducing an influence of the parasitic capacitance on charging and discharging of the touch driving electrode 6.

An embodiment of the present disclosure further provides a driving method of a display device. The driving method is applied to the display device as claimed in claim 1. FIG. 14 is a flowchart of a driving method according to an embodiment of the present disclosure. In conjunction with FIG. 3 to FIG. 6, as shown in FIG. 14, the driving method includes following steps.

At step S1, the touch driving signal TX is provided to the touch driving electrode 6; the driving cycle of the touch driving electrode 6 includes the charging period t1, the potential maintaining period t2, and the discharging period t3; during the charging period t1, the touch driving signal TX is charged from the first level to the second level; and during the charging period t3, the touch driving signal TX is discharged from the second level to the first level.

At step S2, the first driving signal FD is provided to the first electrode 10; during the charging period t1, the first driving signal FD is charged from the third level to the fourth level; and during the charging period t3, the first driving signal FD is discharged from the fourth level to the third level.

When the first electrode 10 is the cathode electrode 4, by providing the first driving signal FD to the cathode electrode 4, during the charging period t1, the potential at the touching driving electrode 6 increases from the first potential V1 to the second potential V2, and the potential at the cathode electrode 4 increases from the third potential V3 to the fourth potential V4, so that with the increase of the potential at the touch driving electrode 6, the potential at the cathode electrode 4 also increases, thereby accelerating charging of the touch driving electrode 6, and accordingly increasing time during which the touch driving electrode 6 is maintained at the stable second potential V2. In this way, the more complete charging of the touch capacitance can be achieved. Analogously, during the discharging period t3, with the decreased of the potential at the touch driving electrode 6, the potential at the cathode electrode 4 also decreases, thereby accelerating discharging of the touch driving electrode 6. In this way, the more complete discharging of the touch driving electrode 6 can be achieved, thereby avoiding influence on a potential in a next cycle, which would otherwise influence charging in the next cycle. When the first electrode 10 is located between the touch driving electrode 6 and the cathode electrode 4, similarly, a change of the potential at the first electrode 10 can be used to accelerate charging and discharging of the touch driving electrode 6, thereby effectively removing an effect on charging and discharging of the touch driving electrode 6 by the stable low potential transmitted on the cathode electrode 4.

With the driving method according to the embodiments of the present disclosure, by providing the first driving signal FD to the first electrode 10, during the charging period t1 and the charging period t3, it is possible to control the potential at the first electrode 10 and the potential at the touch driving electrode 6 to change in a same direction, thereby accelerating charging and discharging of the touch driving electrode 6. In this way, the more complete charging and discharging of the touch driving electrode 6 can be achieved, so that the touch capacitance formed between the touch driving electrode 6 and the touch sensing electrode 7 can be charged to a standard capacitance value. When a touch occurs, a change of the capacitance value of the touch capacitance at the touch position can reach a change threshold, thereby effectively increasing the detection accuracy of the touch position.

Further, in conjunction with FIG. 6, the first level has the first potential V1, the second level has the second potential V2, the third level has the third potential V3, and the fourth level has the fourth potential V4. During the potential maintaining period t2, the touch driving signal TX is maintained at the second potential V2, and the first driving signal FD is maintained at the fourth potential V4. There is a first potential difference between the first potential V1 and the second potential V2, and there is a second potential difference between the third potential V3 and the fourth potential V4. The first potential difference is equal to the second potential difference. In such a configuration, during the charging period t1, the touch driving electrode 6 and the first electrode 10 have a same charging slope. During the charging period t3, the touch driving electrode 6 and first electrode 10 have a same discharging slope. A change of the first driving signal FD is consistent with as a change the touch driving signal TX during each period. That is, two ends of the parasitic capacitance have a same potential change, so that the signal transmitted on the first electrode 10 can be used to accelerate charging and discharging of the touch driving electrode 6 to a greater extent.

In an example, in conjunction with FIG. 7, the first driving signal FD is provided to the first electrode 10 by: transmitting the third potential V3 provided by the third potential signal line 20 to the first electrode 10 under driving of the first level of the touch driving signal TX; and transmitting the fourth potential V4 provided by the fourth potential signal line 21 to the first electrode 10 under driving of the second level of the touch driving signal TX. With the illustrated driving method, the first driving signal FD is generated based on the touch driving signal TX, thereby further improving reliability of a same change direction of the first driving signal FD and the touch driving signal TX, and thus further accelerating charging and discharging of the touch driving electrode 6.

In an example, in conjunction with FIG. 8, the first driving signal FD is provided to the first electrode 10 by: outputting the first control signal provided by the first control signal line 24 under driving of the first level of the touch driving signal TX, and transmitting the third potential V3 provided by the third potential signal line 20 to the first electrode 10 in response to the first control signal; and outputting the second control signal provided by the second control signal line 25 under driving of the second level of the touch driving signal TX, and transmitting the fourth potential V4 provided by the fourth potential signal line 21 to the first electrode 10 in response to the second control signal. With such a driving method, the first driving signal FD is generated based on the touch driving signal TX, thereby further improving reliability of a same change direction of the first driving signal FD and the touch driving signal TX, and thus further accelerating charging and discharging of the touch driving electrode 6

The above-described embodiments are merely preferred embodiments of the present disclosure and are not intended to limit the present disclosure. Any modifications, equivalent substitutions and improvements made within the principle of the present disclosure shall fall into the protection scope of the present disclosure.

Finally, it should be noted that, the above-described embodiments are merely for illustrating the present disclosure but not intended to provide any limitation. Although the present disclosure has been described with reference to the above-described embodiments, it should be understood by those skilled in the art that, that it is still possible to modify the technical solutions described in the above embodiments or to equivalently replace some or all of the technical features therein, but these modifications or replacements do not cause the corresponding technical solutions to depart from the scope of the present disclosure.

What is claimed is:

1. A display device, comprising:
   a display panel comprising: a substrate; a cathode layer located at a side of the substrate, the cathode layer comprising a cathode electrode; and touch electrodes located at a side of the cathode layer facing away from the substrate, the touch electrodes comprising a touch driving electrode and a touch sensing electrode;
   a touch driving chip electrically connected to the touch driving electrode and configured to provide a touch driving signal to the touch driving electrode, wherein the touch driving electrode has a driving cycle comprising a charging period, a potential maintaining period and a discharging period; wherein, during the charging period, the touch driving signal is charged from a first level to a second level; and during the discharging period, the touch driving signal is discharged from the second level to the first level; and
   a signal conversion unit electrically connected to a first electrode and configured to provide a first driving signal to the first electrode, wherein, during the charging period, the first driving signal is charged from a third level to a fourth level, and during the discharging period, the first driving signal is discharged from the fourth level to the third level,
   wherein the first electrode is the cathode electrode, or the first electrode is located between the touch driving electrode and the cathode electrode.

2. The display device according to claim 1, wherein the first level has a first potential, the second level has a second potential, the third level has a third potential, and the fourth level has a fourth potential;
   during the potential maintaining period, the touch driving signal is maintained at the second potential, and the first driving signal is maintained at the fourth potential; and
   a first potential difference between the first potential and the second potential is equal to a second potential difference between the third potential and the fourth potential.

3. The display device according to claim 2, wherein the signal conversion unit is further electrically connected to the touch driving chip, and the signal conversion unit is configured to provide the first driving signal to the first electrode under driving of the touch driving signal.

4. The display device according to claim 3, wherein the signal conversion unit comprises:
   a first control module electrically connected to a third potential signal line, the touch driving chip and the first electrode, the first control module being configured to transmit the third potential provided by the third potential signal line to the first electrode under driving of the first level of the touch driving signal; and
   a second control module electrically connected to a fourth potential signal line, the touch driving chip and the first electrode, the second control module being configured to transmit the fourth potential provided by the fourth potential signal line to the first electrode under driving of the second level of the touch driving signal.

5. The display device according to claim 4, wherein the first control module comprises a first transistor, the first transistor comprising a gate electrode electrically connected to the touch driving chip, a first terminal electrically connected to the third potential signal line, and a second terminal electrically connected to the first electrode; and
   the second control module comprises a second transistor, the second transistor comprising a gate electrode electrically connected to the touch driving chip, a first terminal electrically connected to the fourth potential signal line, and a second terminal electrically connected to the first electrode.

6. The display device according to claim 3, wherein the signal conversion unit further comprises:
   a first signal conversion circuit electrically connected to a first control signal line, a second control signal line and the touch driving chip, the first signal conversion circuit being configured to output a first control signal provided by the first control signal line under the driving of the first level of the touch driving signal and to output a second control signal provided by the second control signal line under the driving of the second level of the touch driving signal; and
   a second signal conversion circuit electrically connected to a third potential signal line, a fourth potential signal line, the first signal conversion circuit and the first electrode, the second signal conversion circuit being configured to transmit the third potential provided by the third potential signal line to the first electrode in response to the first control signal and to transmit the fourth potential provided by the fourth potential signal line to the first electrode in response to the second control signal.

7. The display device according to claim 6, wherein the first signal conversion circuit comprises:
   a third control module electrically connected to the first control signal line, the touch driving chip and the second signal conversion circuit, the third control module configured to output the first control signal under the driving of the first level of the touch driving signal; and
   a fourth control module electrically connected to the second control signal line, the touch driving chip and the second signal conversion circuit, the fourth control module configured to output the second control signal under the driving of the second level of the touch driving signal.

8. The display device according to claim 7, wherein
   the third control module comprises a third transistor, the third transistor comprising a gate electrode electrically connected to the touch driving chip, a first terminal electrically connected to the first control signal line, and a second terminal electrically connected to the second signal conversion circuit; and
   the fourth control module comprises a fourth transistor, the fourth transistor comprising a gate electrode electrically connected to the touch driving chip, a first terminal electrically connected to the second control signal line, and a second terminal electrically connected to the second signal conversion circuit.

9. The display device according to claim 6, wherein the second signal conversion circuit comprises:
   a fifth control module electrically connected to the third potential signal line, the first signal conversion circuit and the first electrode, the fifth control module configured to transmit the third potential to the first electrode in response to the first control signal; and
   a sixth control module electrically connected to the fourth potential signal line, the first signal conversion circuit and the first electrode, the sixth control module configured to transmit the fourth potential to the first electrode in response to the second control signal.

10. The display device according to claim 9, wherein
    the fifth control module comprises a fifth transistor, the fifth transistor comprising a gate electrode electrically connected to the first signal conversion circuit, a first terminal electrically connected to the third potential signal line, and a second terminal electrically connected to the first electrode; and
    the sixth control module comprises a sixth transistor, the sixth transistor comprising a gate electrode electrically connected to the first signal conversion circuit, a first terminal electrically connected to the fourth potential signal line, and a second terminal electrically connected to the first electrode.

11. The display device according to claim 2, wherein the first electrode is the cathode electrode, and the fourth potential is V4, where $-3.7V \leq V4 \leq -1.7V$.

12. The display device according to claim 1, further comprising a flexible circuit board bound to the display panel, wherein the signal conversion unit is arranged on the flexible circuit board.

13. The display device according to claim 1, wherein the display panel has a display area and a non-display area surrounding the display area, the non-display area comprises a first non-display area, and the first non-display area comprises a chip-binding area; and
    wherein the signal conversion unit is arranged in the first non-display area.

14. The display device according to claim 1, wherein the signal conversion unit is integrated into the touch driving chip.

15. The display device according to claim 1, further comprising a display driving chip, wherein the signal conversion unit is integrated into the display driving chip.

16. The display device according to claim 1, wherein
    the touch driving electrode comprises a plurality of touch metal wires;
    the cathode layer has a hollow area, and
    in a direction perpendicular to a plane of the cathode layer, the plurality of touch metal wires is located in the hollow area.

17. A driving method of a display device, wherein the driving method is applied to a display device,
    wherein the display device comprises:
    a display panel comprising: a substrate; a cathode layer located at a side of the substrate and comprising a cathode electrode; and touch electrodes located at a side of the cathode layer facing away from the substrate and comprising a touch driving electrode and a touch sensing electrode;
    a touch driving chip electrically connected to the touch driving electrode and configured to provide a touch driving signal to the touch driving electrode; and
    a signal conversion unit electrically connected to a first electrode and configured to provide a first driving signal to the first electrode,
    wherein the first electrode is the cathode electrode, or the first electrode is located between the touch driving electrode and the cathode electrode,
    wherein the driving method comprises:
    providing the touch driving signal to the touch driving electrode, wherein the touch driving electrode has a driving cycle comprising a charging period, a potential maintaining period, and a charging period, wherein during the charging period, the touch driving signal is charged from a first level to a second level, and during the discharging period, the touch driving signal is discharged from the second level to the first level; and
    providing the first driving signal to the first electrode, wherein during the charging period, the first driving signal is charged from a third level to a fourth level, and during the charging period, the first driving signal is discharged from the fourth level to the third level.

18. The driving method according to claim 17, wherein
    the first level has a first potential, the second level has a second potential, the third level has a third potential, and the fourth level has a fourth potential;
    during the potential maintaining period, the touch driving signal is maintained at the second potential, and the first driving signal is maintained at the fourth potential; and
    a first potential difference between the first potential and the second potential is equal to a second potential difference between the third potential and the fourth potential.

19. The driving method according to claim 18, wherein said providing the first driving signal to the first electrode comprises:

transmitting the third potential provided by a third potential signal line to the first electrode under driving of the first level of the touch driving signal; and transmitting the fourth potential provided by a fourth potential signal line to the first electrode under driving of the second level of the touch driving signal.

20. The driving method according to claim 18, wherein said providing the first driving signal to the first electrode comprises:

outputting a first control signal provided by a first control signal line under driving of the first level of the touch driving signal, and transmitting the third potential provided by a third potential signal line to the first electrode in response to the first control signal; and outputting a second control signal provided by a second control signal line under driving of the second level of the touch driving signal, and transmitting the fourth potential provided by the fourth potential signal line to the first electrode in response to the second control signal.

* * * * *